Patented July 10, 1945

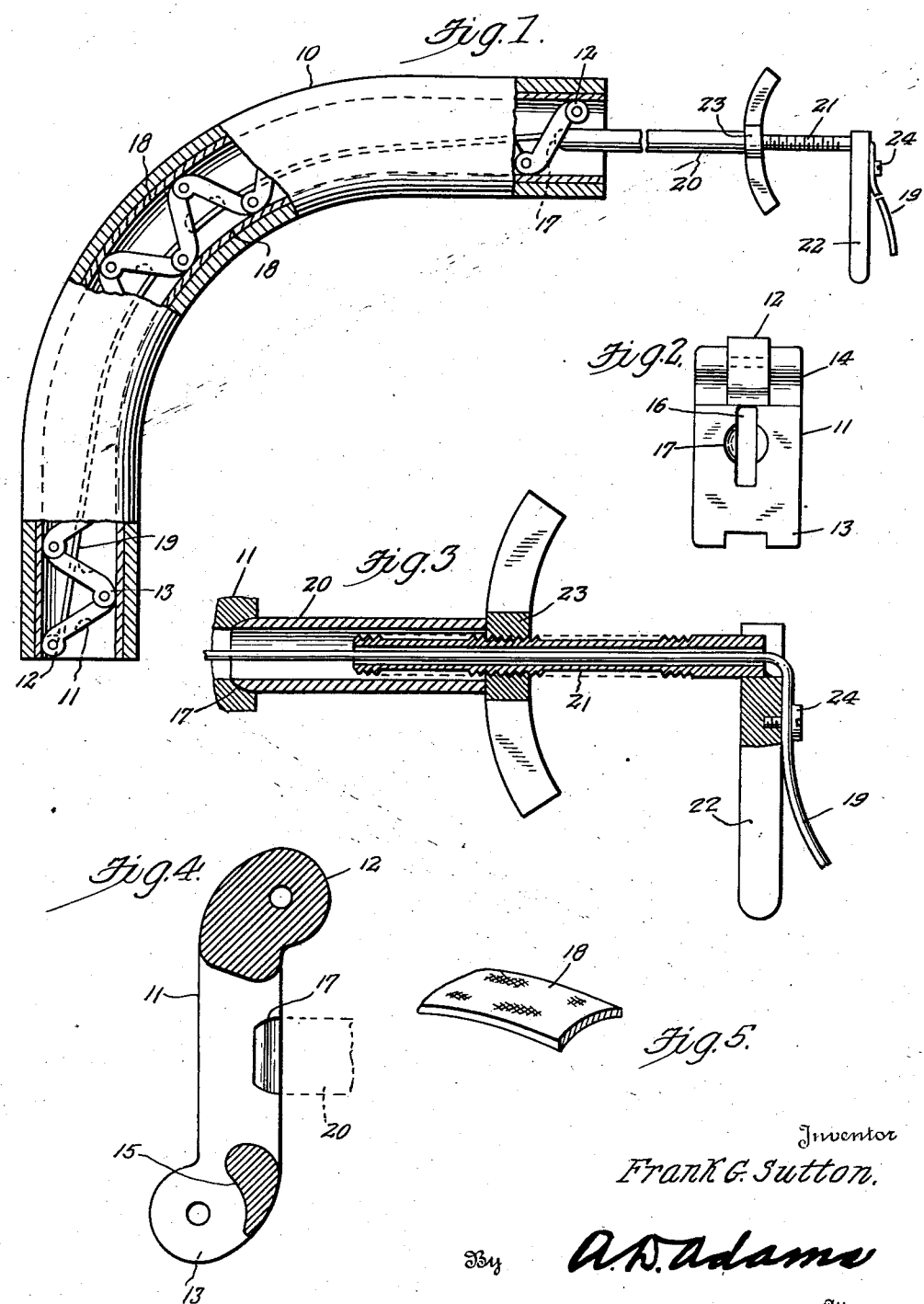

2,380,344

UNITED STATES PATENT OFFICE 2,380,344

CHAIN MANDREL FOR BENDING PIPES

Frank G. Sutton, Key West, Fla.

Application December 31, 1943, Serial No. 516,435

5 Claims. (Cl. 153—63)

This invention relates to chain mandrels for bending pipes to prevent them from buckling or crumpling at the bends and, among other objects, aims to provide an improved sprocket-type chain adapted to be inserted in a pipe section and expanded by means of a cable or wire to engage the pipe wall and brace it at the bend during the bending operation. Another aim of the invention is to provide a novel screw means coacting with the cable to expand the chain mandrel in a pipe section. Still another aim is to provide flexible liners or strips adapted to be inserted in large pipes on opposite sides of the chain so that a single chain may be used to bend pipes of a number of different sizes.

Other aims and advantages of the invention will appear in the specification, when considered in connection with the accompanying drawing, wherein:

Figure 1 is a side elevation, parts being broken away, of a bent section of pipe with the improved chain mandrel applied;

Fig. 2 is a front elevation of one of the chain links;

Fig. 3 is a longitudinal sectional view of the mandrel expanding elements shown in Fig. 1;

Fig. 4 is an enlarged sectional view of the chain link shown in Fig. 2; and

Fig. 5 is a fragmentary perspective view of a flexible liner or strip adapted to be used in large pipes.

Referring particularly to the drawing, the chain mandrel is shown as being expanded in a length of pipe 10 having a single right angle bend. The chain is shown as being of the sprocket type composed of identical, one-piece links 11 each having a single ear 12 at one end and a pair of spaced ears 13 at the other end. The ears are of cylindrical contour and the links have rounded bearings or seats 14 and 15 at the opposite ends to permit pivotal movement of the links.

Each link is composed of a case-hardened or tempered casting and has an opening 16 in the middle. The ears are pivotally connected by ordinary pivot pins, similar to those used in bicycle sprocket chains.

The opposite side legs of each link are shown as having spherical depressions or seats 17 on one side to provide for the use of an expander sleeve.

In this instance, a chain, composed of the desired number of links to make a bend, is expanded in the pipe 10 against a pair of flexible liners or shims 18 on opposite sides of the pipe. These shims may be bent strips, as shown in Fig. 5, to conform generally to the contour of the pipe. They may be made of asbestos, wall board or of flexible metal, such as lead or copper. In some cases they may be made of ordinary, narrow strips having holding clips to engage the straightened chain before it is inserted in the pipe. However, they may be made, as shown, and held in place on the chain by small wire or cotton threads (not shown) tied around them and the links at spaced intervals.

In Fig. 1, a wire or cable 19 is shown as being secured to the lower end link 11 and extends through the openings in all of the links. It is threaded through a spacer pipe or crowding sleeve 20 of the desired length to take up the slack in the chain after it is inserted. The inner end of the sleeve is preferably rounded so that it will be seated in the spherical depressions 17 (Fig. 3) and exert pressure on the crowding link. The cable is also passed through a hollow, screw threaded member or tube 21 adapted to telescope within the crowding sleeve 20 and this tube has a handle 22 secured to its outer end. A wing-nut 23 is threaded on the screw member and abuts the outer end of the crowding sleeve. The outer end portion of the cable is secured to the handle 22, conveniently by means of a binding screw 24. Now, by turning the wing-nut 23 in the proper direction, it will be seen that the crowding sleeve will be forced inwardly against the crowding link and thus expand the chain diametrically of the pipe, as shown. All of the links have rounded knuckle joints and they are always crowded, zigzag fashion, into a pipe with the knuckles engaging the pipe wall or shims.

It will be understood that the expanded chain mandrel with or without the shims is located in the plane of the desired bend before the pipe section is bent. Then, the pipe section may be bent by any known method. After the bend is made the chain is loosened by turning the wing-nut 23 and releasing the tension on the crowding cable 19, so that the links will collapse and the chain may be pulled out of the pipe. Then, the shims may be discarded or used again if they are not badly mutilated. When the shims are made of asbestos, or pulp board as preferred, they permit the inside wall of the pipe to crawl on knuckle joints of the chain during the bending operation without developing an undue amount of frictional resistance.

It is also possible to use only a part of a long chain within a short section of pipe, permitting the free links to hang outside the pipe. All the links preferably have the depressions or seats 17 on one or both sides, so that the crowding sleeve may engage any one of them.

From the foregoing description it will be seen that the improved chain mandrel can be manufactured at a relatively low cost. It is easily assembled and applied to pipes of different sizes. Also, the screw operated crowding or expanding members are easy to manipulate. The operator simply holds the handle 22 and turns the wing-nut 23 to tighten or loosen the mandrel in a pipe. It is contemplated that a multiplicity of shims of different thicknesses will be supplied with each chain mandrel to enable it to be used in larger pipes than those for which it is intended.

Obviously, the present invention is not restricted to the particular embodiment thereof herein shown and described.

What is claimed is:

1. A chain mandrel for bending pipes comprising in combination, a sprocket-like chain composed of pivoted links having rounded knuckle joints adapted to be inserted in a pipe to be bent; a crowding cable secured to one end link; and screw means coacting with the other end portion of the links, zig-zag fashion, to crowd and expand the chain diametrically of the pipe.

2. A chain mandrel, as set forth in claim 1, wherein the screw means includes a crowding sleeve engaging a crowding link in the pipe, and a screw threaded tube through which the cable is threaded is telescoped within the sleeve having a tightening nut acting against the sleeve.

3. A chain mandrel, as set forth in claim 1, wherein the screw means includes a crowding sleeve in the form of a piece of pipe having a rounded end engaging a crowding link in the pipe, and an externally screw-threaded tube is telescoped within the crowding sleeve with a handle on its outer end to which the cable is secured, and a wing-nut is provided on the tube to tighten the cable and thereby expand the chain against the interior wall of the pipe.

4. A chain mandrel, as set forth in claim 1, wherein the chain links having central openings through which the crowding cable is threaded, and the screw means includes a crowding sleeve having a rounded end seated in depressions provided in the crowding link.

5. A chain mandrel, as set forth in claim 1, wherein separate shims formed of elongated, flexible strips are inserted in the pipe to reduce its effective diameter and to coact with the rounded knuckle joints of the chain.

FRANK G. SUTTON.